(12) United States Patent
Doi (10) Patent No.: US 7,911,911 B2
(45) Date of Patent: Mar. 22, 2011

(54) OPTICAL DISK DEVICE AND CONTROL METHOD

(75) Inventor: Akihiko Doi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 170 days.

(21) Appl. No.: 12/415,696

(22) Filed: Mar. 31, 2009

(65) Prior Publication Data

US 2009/0245045 A1    Oct. 1, 2009

(30) Foreign Application Priority Data

Mar. 31, 2008   (JP) ................ 2008-093644

(51) Int. Cl.
*G11B 7/00* (2006.01)

(52) U.S. Cl. .............. 369/59.11; 369/59.1; 369/116; 369/47.5

(58) Field of Classification Search ............ None
See application file for complete search history.

(56) References Cited

U.S. PATENT DOCUMENTS 7,460,461 B2 * 12/2008 Hsu et al. .............. 369/116
7,773,477 B2 *  8/2010 Kodama ................ 369/59.11

FOREIGN PATENT DOCUMENTS

| JP | 2003-078203 A | 3/2003 |
| JP | 2005-038470 A | 2/2005 |
| JP | 2005-339790 A | 12/2005 |
| JP | 2006-164364 A | 6/2006 |

* cited by examiner

*Primary Examiner* — Muhammad N Edun
(74) *Attorney, Agent, or Firm* — Knobbe, Martens Olson & Bear LLP (57) ABSTRACT

According to one embodiment, an optical disk device includes a laser light source that emits laser light to be applied to an optical disk, an automatic power control circuit that controls a laser output of the laser light source, and a control processor that performs a setting data transmission process for the automatic power control circuit. The automatic power control circuit includes an operation setting module that makes an operation setting according to setting data obtained in the setting data transmission process of the control processor and a condition determining module that determines whether an operation setting permission condition containing the number of clocks during a transmission period of the setting data is adequate, and inhibits the operation setting of the operation setting module when the operation setting permission condition is not adequate.

9 Claims, 4 Drawing Sheets

OPTICAL DISK DEVICE AND CONTROL METHOD

CROSS-REFERENCE TO RELATED APPLICATIONS

This application is based upon and claims the benefit of priority from Japanese Patent Application No. 2008-093644, filed Mar. 31, 2008, the entire contents of which are incorporated herein by reference.

BACKGROUND

1. Field

One embodiment of the present invention relates to an optical disk device and control method in which software is used for digital control of a laser light source.

2. Description of the Related Art

Recently, the integration density of digital ICs has been markedly enhanced. Along with this, an attempt is made to reduce the cost by integrating control hardware of an optical disk device as a digital IC and applying software for digital control of a laser light source.

In a general optical disk device, a control processor is provided as a digital IC that generates setting data items such as a laser driving current value, operation mode and parameters of a recording waveform and transmits the above data items to an automatic power control circuit in a serial form. In the automatic power control circuit, a laser driver that drives a laser light source such as a semiconductor laser element and a light amount detecting module that detects the light amount of laser light emitted from the laser light source are provided, and the operation setting of the laser driver and light amount detecting module are made based on the setting data items. The setting data may vary due to an influence of electromagnetic noise and static electricity applied from the exterior during the transmission. If the setting data set in the varied state is received by the automatic power control circuit, a malfunction occurs in the laser driver and light amount detecting module. For example, if an excessive amount of laser driving current flows into the semiconductor laser element of the laser light source as a result of the malfunction, this causes the semiconductor laser element to be destroyed.

There already exists a technique for checking data transmitted to the automatic power control circuit as recording information with respect to an optical disk (for example, see Jpn. Pat. Appln. KOKAI Publication No. 2003-78203). With the above technique, a microcomputer (control processor) performs a process of transmitting data to the automatic power control circuit, a process of acquiring data stored in the automatic power control circuit, a process of comparing the transmission data with the stored data and a process of permitting the automatic power control circuit to record the stored data when it is confirmed from the comparison result that the stored data is correct.

However, when the technique disclosed in Jpn. Pat. Appln. KOKAI Publication No. 2003-78203 is applied to the above transmission process of the setting data, the time required for performing the 4-step process cannot always be attained thus the operation setting in the automatic power control circuit tends to be delayed. Further, in Jpn. Pat. Appln. KOKAI Publication No. 2003-78203, a control operation of delaying the data transmission speed is performed when non-coincidence of data items occurs, in order to obtain a margin for data communication timing. Thus, the operation setting tends to be delayed due to the control operation.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION OF THE INVENTION

Various embodiments according to the invention will be described hereinafter with reference to the accompanying drawings.

According to one embodiment of the invention, there is provided an optical disk device comprising a laser light sources configured to emit laser light to be applied to an optical disk, an output control circuit configured to control a laser output of the laser light source, and a processing module configured to perform a setting data transmission process for the output control circuit, the output control circuit including an operation setting module configured to make an operation setting according to setting data obtained in the setting data transmission process of the processing module and a condition determining module configured to determine whether an operation setting permission condition containing the number of clocks during a transmission period of the setting data is adequate, and to inhibit the operation setting of the operation setting module when the operation setting permission condition is not adequate.

According to one embodiment of the invention, there is provided a control method for an optical disk device which comprises a laser light source configured to emit laser light to be applied to an optical disk, an output control circuit configured to control a laser output of the laser light source, and a processing module configured to perform a setting data transmission process for the output control circuit, the method comprising determining whether an operation setting permission condition containing the number of clocks during a transmission period of setting data acquired in the setting data transmission process of the processing module is adequate, and inhibiting the operation setting corresponding to setting data when the operation setting permission condition is not adequate.

In the optical disk device and control method, it is determined whether the operation setting permission condition containing the number of clocks during the transmission period of setting data is adequate. When the operation setting permission condition is not adequate, the operation setting corresponding to setting data is inhibited. Therefore, an erroneous operation setting is not caused by an influence of electromagnetic noise and static electricity applied externally and, as a result, a malfunction of the optical disk device can be prevented. Further, since the processing module does not need to determine an error of the setting data transmitted to the output control circuit, the operation setting can be made quickly. The output control circuit can determine that the operation setting permission condition containing the number of clocks during the transmission period of setting data is not adequate, even when the processing module runs away in its software-based operation. Thus, the laser output of the laser light source is prevented from being erroneously set.

An optical disk device according to one embodiment of the invention will be described below.

Figure 1:
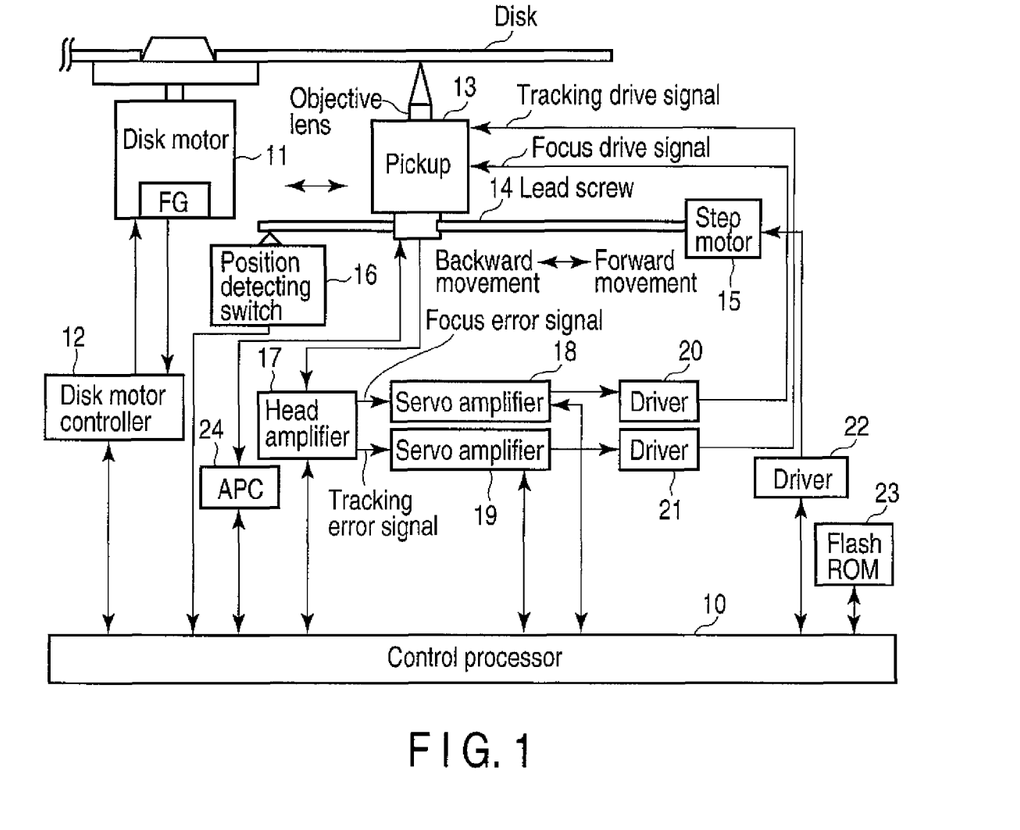
FIG. 1 is an exemplary block diagram showing the configuration of an optical disk device according to one embodiment of the invention.

FIG. 1 shows the configuration of the optical disk device.

An optical disk is rotatably mounted on a disk motor 11. A frequency generator FG is provided on the disk motor 11. A control processor 10 compares a rotation angle signal from the frequency generator FG with an internal reference frequency and controls a disk motor controller 12 to set the disk motor 11 to a predetermined rotational direction and rotation speed based on a difference signal obtained as a result of comparison.

A pickup 13 is provided to face the information recording surface of the disk, supported on a sliding shaft (not shown) to be movable in a radial direction of the disk, and moved by a lead screw 14. A step motor 15 is a feeding motor of the pickup 13 and the rotating shaft thereof is directly coupled with the lead screw 14. A position detecting switch 16 is arranged in a home position of the pickup 13 and detects that the pickup 13 reaches the home position when the pickup 13 moves to the inner peripheral side of the disk and comes into contact with the position detecting switch 16. The position detecting switch 16 is used to initialize the position of the pickup 13.

Laser light is divided into three beams by a diffraction grating, converged by an objective lens via an optical component (not shown) provided in the pickup 13 and applied to form a spot on the information recording surface of the disk. Laser light reflected from the disk returns to the objective lens and is made incident on an 8-division detector via the internal optical component. A focus error signal is based on an astigmatism method and a tracking error signal is based on a DPP method. The detector performs a current-voltage conversion process for incident light by use of an IC in the pickup and outputs a signal obtained as a result of conversion to a predetermined head amplifier 17.

The objective lens is supported by a spring to be movable in an optical axis direction (focusing direction) of laser light and in a radial direction (tracking direction) of the disk. In this example, coils and magnets are provided to drive the objective lens in the focusing direction and tracking direction. Such a two-directional movement member is called a 2-axial actuator. The focusing coil is driven by a focus drive signal output from a driver 20 and the tracking coil is driven by a tracking drive signal output from a driver 21. The drivers 20 and 21 are respectively connected to servo amplifiers 18 and 19. The servo amplifier 18 is controlled by the control processor 10 to generate a focus drive signal in accordance with the focus error signal from the head amplifier 17. The servo amplifier 19 is controlled by the control processor 10 to generate a tracking drive signal in accordance with the tracking error signal from the head amplifier 17.

The control processor 10 acquires disk address information from a high-frequency (RF) signal obtained as an information signal and other signals from the head amplifier 17 by use of CD, DVD and high-density recording DVD demodulators and address decoders (not shown). In the process of controlling a step motor 15, the control processor 10 generates 2-phase sinusoidal signals, power-amplifies the signals, and outputs the thus amplified signals to the driver 22.

Figure 2:
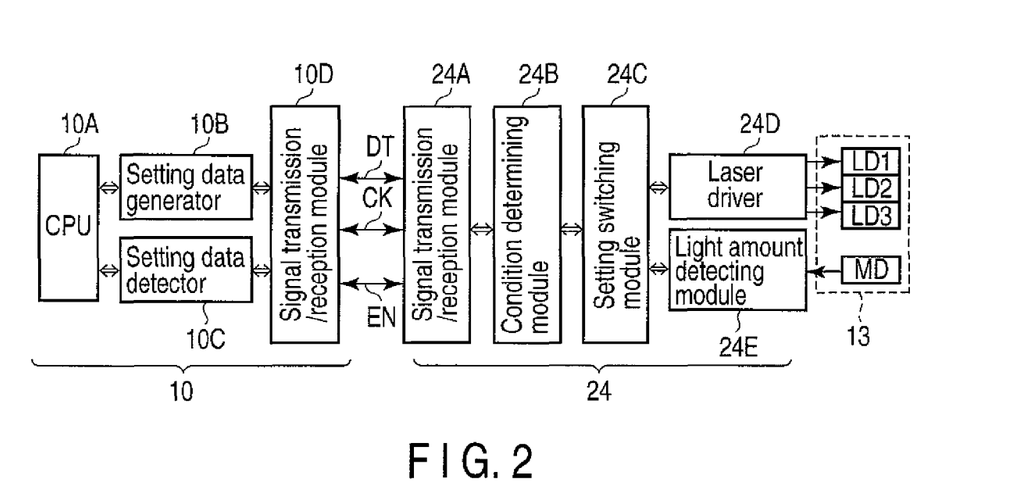
FIG. 2 is an exemplary block diagram showing the configurations of a control processor, automatic power control circuit and pickup shown in FIG. 1 in more detail.

FIG. 2 shows the configurations of the control processor 10, automatic power control circuit 24 and pickup 13 shown in FIG. 1 more in detail. The pickup 13 includes three laser diodes (semiconductor laser elements) LD1, LD2, and LD3 that serve as laser light sources for emitting laser light to be applied to the optical disk, and a monitor diode MD that monitors laser light emitted from each of the laser diodes LD1, LD2, and LD3. The wavelengths of laser lights from the laser diodes LD1, LD2, and LD3 are set to 780 nm, 650 nm and 405 nm respectively corresponding to a CD, DVD and high-density recording DVD. The automatic power control circuit 24 makes the operation setting under the digital control of the control processor 10 and controls a laser output of the laser light source as the result of the operation setting.

Figure 3:
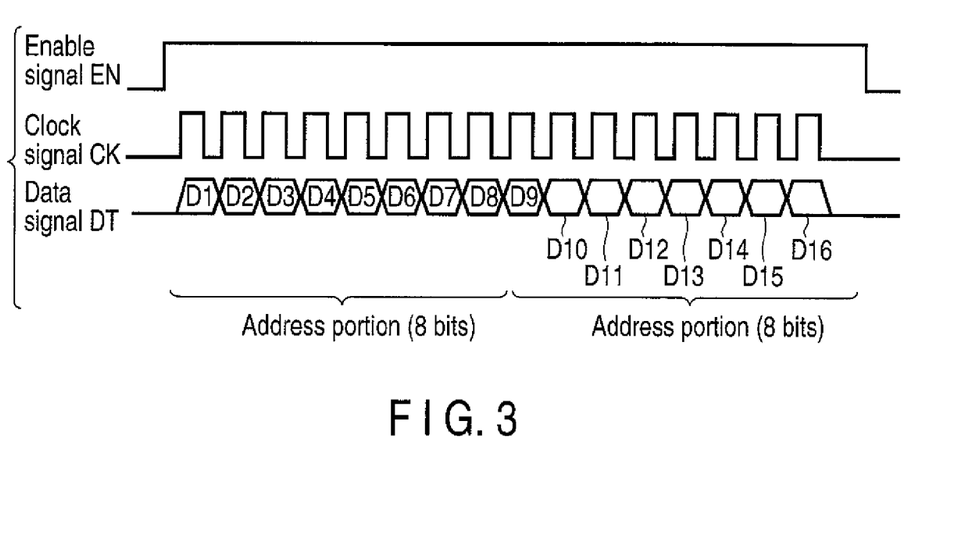
FIG. 3 is an exemplary diagram showing a data signal, clock signal and enable signal transmitted in the transmission/reception process of setting data performed by the automatic power control circuit shown in FIG. 2.

The control processor 10 includes a CPU 10A that performs various processes according to a software program, a setting data generator 10B that generates setting data for the operation setting of the automatic power control circuit 24 under the control of the CPU 10A, a setting data detector 10C that detects setting data from the automatic power control circuit 24 and a signal transmission/reception module 10D that performs a transmission/reception process of setting data with respect to the automatic power control circuit 24. As shown in FIG. 3, in the transmission/reception process, the signal transmission/reception module 10D transmits and receives a data signal DT representing setting data in a serial form, a clock signal CK synchronized with the data signal DT and an enable signal EN that defines a transmission period. The setting data is formed of an 8-bit address portion that specifies an operation setting item and an 8-bit data portion that represents a setting value of the operation setting item. In this example, the data signal DT includes 16 data bits, the enable signal EN is maintained at the high level for the transmission period and the clock signal CK is a group of pulses that are synchronized with the data bits of the data signal DT.

Figure 4:
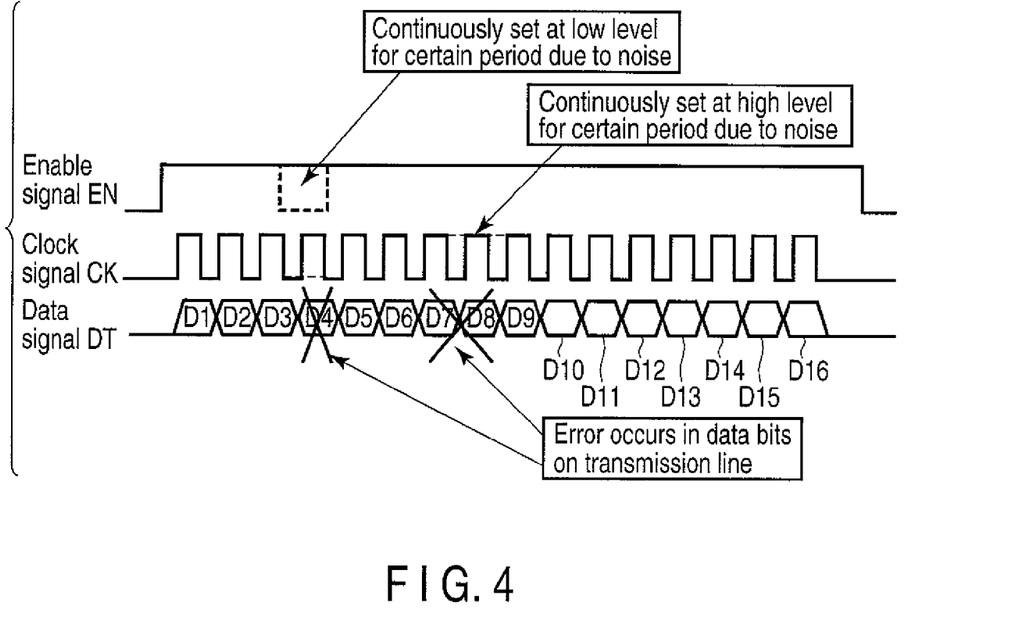
FIG. 4 is an exemplary diagram showing an influence of noise created as disturbances of the data signal, clock signal and enable signal shown in FIG. 3.

FIG. 4 shows an influence of noise created as disturbances of the data signal DT, clock signal CK and enable signal EN. In this example, the enable signal EN is maintained at a low level for a certain period due to an influence of noise and the clock signal CK is maintained at a high level for a certain period due to an influence of noise. In this case, errors occur in data bits D4, D7, and D8.

The automatic power control circuit 24 includes a signal transmission/reception module 24A, a condition determining module 24B, a setting switching module 24C, a laser driver 24D and a light amount detecting module 24E. The signal transmission/reception module 24A performs a transmission/reception process of setting data for the control processor 10. The condition determining module 24B determines whether an operation setting permission condition containing the number of clocks during the setting data transmission period is adequate, and inhibits the operation setting when the operation setting permission condition is not adequate. More specifically, setting data is extracted from the data signal DT in synchronism with clocks of the clock signal CK in the transmission period defined by the enable signal EN, and the setting data is output to an operation setting module formed of the setting switching module 24C, laser driver 24D and light amount detecting module 24E when the number of clocks of the clock signal CK obtained in the transmission period coincides with a preset value "16", which is the total bit number of the setting data. When the number of clocks of the clock signal CK does not coincide with the preset value "16", the setting data is discarded without being output to the operation setting module. The operation setting module makes the operation setting in response to the setting data. In the operation setting, the setting switching module 24C checks the setting data and switches a setting value of a setting item specified as a target of the operation setting. That is, selection of the laser diodes LD1, LD2 and LD3, setting of a light amount corresponding to the characteristic of the laser diode to be driven, and setting of the operation condition such as a current amplification factor are performed as the operation setting. As a result, the laser driver 24D changes the laser driving current for each of the laser diodes LD1, LD2 and LD3, and interrupts the laser driving current according to a recording pulse. Further, the light amount detecting module 24E performs selection of the optimum detection gain to cope with a difference in the wavelengths of the laser diodes LD1, LD2 and LD3, and adjustment of the gain to be suitable for the detected light amount which remarkably differs between the recording operation and reproducing operation. The detection result of the light amount detecting module 24E is used to control the laser driving current such that the amount of laser light from the laser light source is kept at a target value. In addition, even if the setting data extracted from the data signal DT is discarded without being output to the operation setting module, the setting data is stored in the condition determining module 24B until the transmission result is confirmed by the control processor 10.

Figure 5:
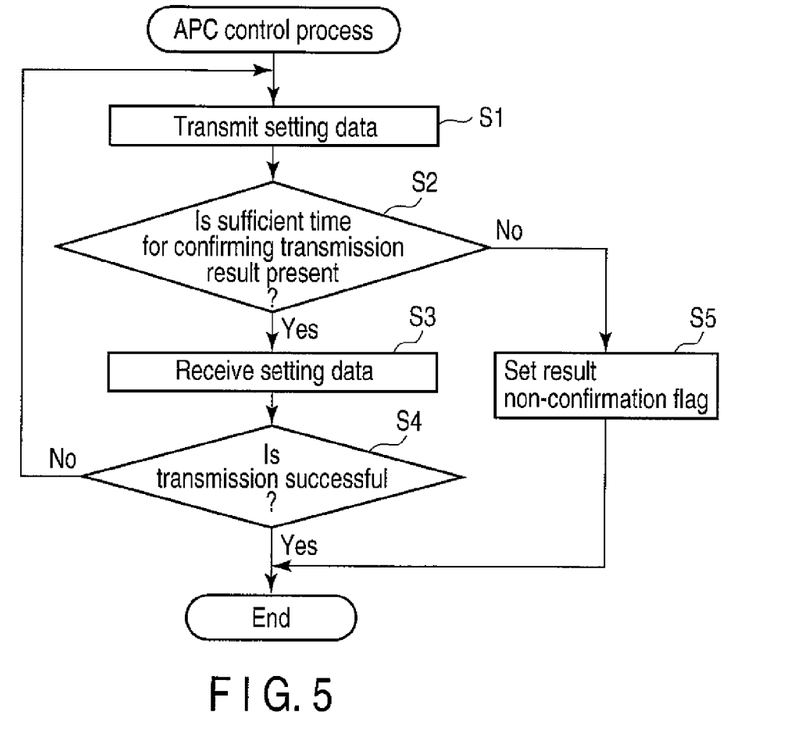
FIG. 5 is an exemplary flowchart for illustrating an APC control process performed by a CPU in the control processor shown in FIG. 2.

FIG. 5 shows an APC control process performed by the CPU 10A in the control processor 10. The CPU 10A performs the APC control process when the operation setting of the automatic power control circuit (ADC) 24 is required. When the APC control process is started, setting data is transmitted to the automatic power control circuit 24 in block S1. In block S2, it is checked whether sufficient time for confirming the transmission result is available. If the time is available, setting data stored as history data is received from the automatic power control circuit 24 in block S3 and it is checked whether the transmission is successful, by comparing the received setting data with the transmitted setting data. If it is determined from coincidence of the setting data items that the transmission is successful, the APC control process is ended. On the other hand, if it is determined from non-coincidence of the setting data items that the transmission fails, the setting data is transmitted to the power control circuit 24 again in block S1.

If it is determined in block S2 that sufficient time for confirming the transmission result is not available, a result non-confirmation flag is set in block S5 and then the APC control process is ended. If the result non-confirmation flag is already set, the CPU 10A confirms the transmission result when sufficient time is available after the APC control process.

Figure 6:
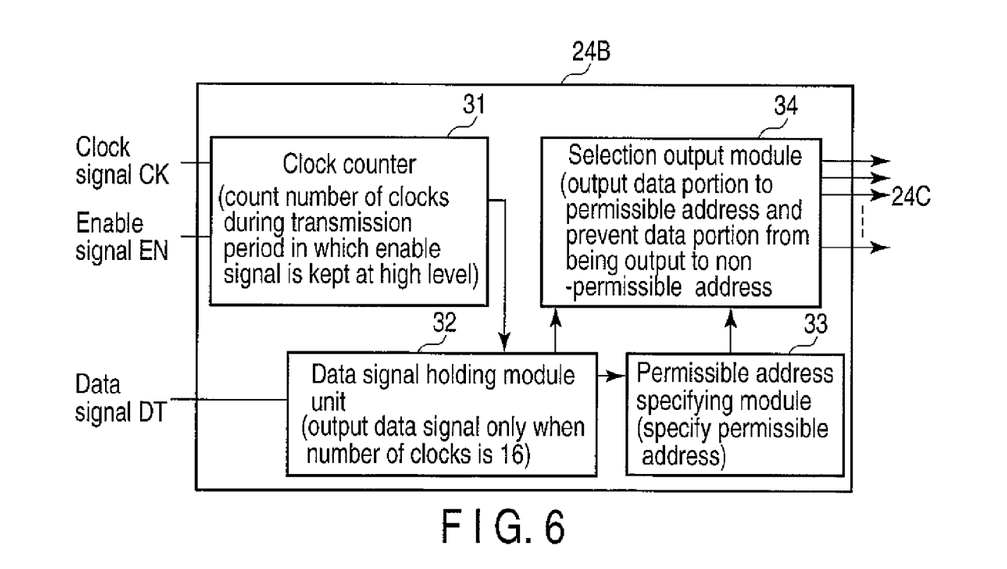
FIG. 6 is a diagram showing an example of the hardware configuration of a condition determining module shown in FIG. 2.

FIG. 6 shows an example of the hardware configuration of the condition determining module 24B. The condition determining module 24B includes a clock counter 31 that counts the number of clocks during the transmission period in which the enable signal EN is maintained at a high (H) level, a data signal holding module 32 that holds a data signal DT to output the data signal only when the number of clocks coincides with "16", a permissible address specifying module 33 that confirms an address portion of the data signal to specify a permissible address, and a selection output module 34 that outputs a setting value of a data portion to an address specified by the permissible address specifying module 33, to the setting switching module 24C.

Figure 7:
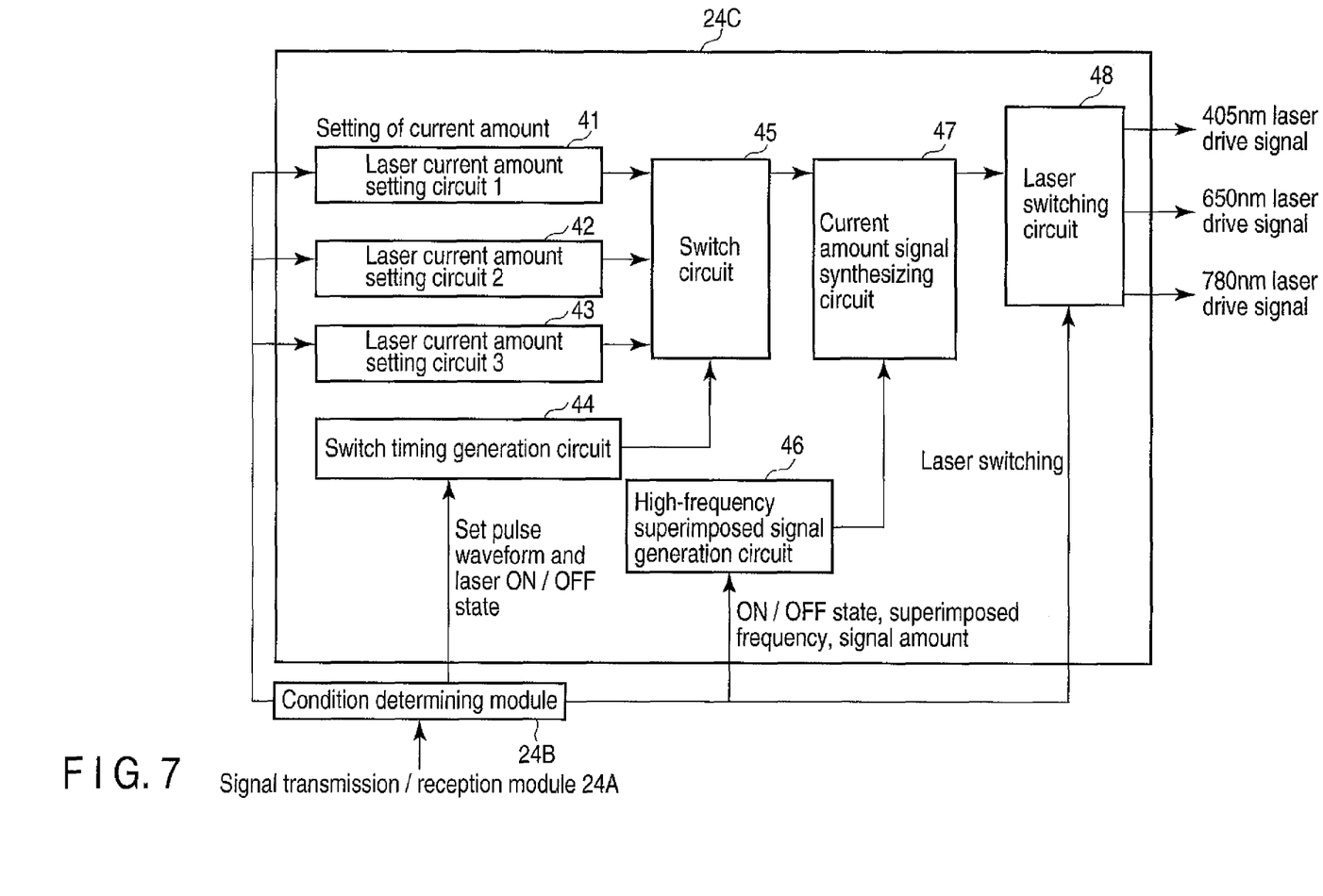
FIG. 7 is a diagram showing an example of the hardware configuration of a setting switching module shown in FIG. 2.

FIG. 7 shows an example of the hardware configuration of the setting switching module 24C. The operation setting items of laser current amounts are set in first to third current setting circuits 41, 42, and 43 that generate current amount signals for the laser diodes LD1, LD2, and LD3. The operation setting items of a pulse waveform and a laser ON/OFF state are set in a switch timing generation circuit 44 that generates a timing signal for one of the laser diodes LD1, LD2, and LD3 which is selected to be set in an on state. A switch circuit 45 outputs the current amount signal for the selected laser diode in response to the timing signal from the switch timing generation circuit 44. The operation setting items of an ON/OFF state, superimpose frequency and signal amount are set in a high-frequency superimpose signal generation circuit 46 that generates a high-frequency superimpose signal. A current amount signal synthesizing circuit 47 superimposes the high-frequency superimpose signal from the high-frequency superimpose signal generation circuit 46 on the current amount signal from the switch circuit 45. A laser switching circuit 48 outputs the current amount signal from the current amount signal synthesizing circuit 47 to the laser driver 24D as an associated one of 780 nm, 650 nm and 405 nm laser drive signals for the laser diodes LD1, LD2, and LD3. Since the operation setting for the light amount detecting module 24E can be made in the same manner as that in the laser driver 24D, the hardware configuration thereof is omitted in FIG. 7.

In the present embodiment, setting data is transmitted as the enable signal EN, clock signal CK and data signal shown in FIG. 3 from the control processor 10 as described above. In this case, a period in which the enable signal EN is maintained at the high level is defined as the transmission period. Therefore, the data signal DT that is transmitted while the enable signal EN is maintained at the high level becomes effective. The clock signal CK is formed of a group of pulses synchronized with the data signal DT, and the timings for detecting data bits of the data signal in the serial form are determined by the above pulses. To determine which one of the high level and low level the data signal DT is set to, the fall timing of the clock signal CK is used as a reference. Further, for example, in a rule of transmitting or receiving 16-bit data by use of 16 clocks, the first bit of the address portion represents a sign of setting or detection, the next seven bits represent an address that specifies an operation setting item, and eight bits of the data portion following after the above bits represent a setting value such as a selected element, a current amount to be supplied, or the like for the specified operation setting item.

When no influence of electromagnetic noise and static electricity is present, the condition determining module 24B detects 16 clocks during the high-level period of the enable signal EN. If the number of clocks is not "16", it is considered that the enable signal EN or clock signal CK has been influenced by electromagnetic noise or static electricity. In this case, an error occurs in the data bits of the data signal DT. To output setting data, the condition determining module 24B confirms that the number of clocks during the transmission period defined by the enable signal EN coincides with "16".

Since signals generated in the device are previously known, a design can be made so as to prevent noise from being introduced in the signals. However, electromagnetic noise from the exterior of the device exert an influence on all of the internal signals. In general, generated noise commonly influence three signal lines if the three signal lines for the data signal DT, clock signal CK and enable signal EN are arranged side by side. Therefore, the relation between the enable signal EN and the clock signal CK is usable to determine whether the signal transmission is correctly performed. Further, a conventional technique of confirming the transmission result only on the side of the control processor 10 is applicable to the case where a sufficient time for the initial condition setting is present before the start of operation. However, if the laser driving current is changed according to an output of light amount detection to control the amount of the light emission or the light amount detection gain is changed upon switching between the recording and reproducing operations, the time before the start of operation becomes short. Therefore, the transmission result is checked instantly at the condition determining module 24B to determine whether the operation setting should be made.

It is considered to use a control technique of making the operation setting according to the received setting data and making the operation setting ineffective upon detection that the setting data is erroneous after the above operation setting is made. However, this may cause an unexpected amount of light to be emitted from the laser light source even in a short period of time. Therefore, there is a possibility that the laser light source is permanently destroyed or a medium is permanently destroyed during the recording or reproducing operation even if the amount of emitted light is not so large as to destroy the laser light source. The problem of erroneous transmission due to electromagnetic noise can be solved by the condition determining module 24B.

As another example, run-away of the CPU 10A is considered. The CPU 10A runs away due to internal operation timings that have drifted due to some reason, and results in transmission of random data. Therefore, the transmission of random data abruptly occurs in the normal operation such as a recording or reproducing operation. In this case, there is almost no possibility that meaningful address and data portions are combined into a signal to be transmitted. Thus, the condition determining module 24B has a function of performing the following permission and inhibition operations.

A condition may be set such that a setting is made based on one data item only in the case where the data item is transmitted after a certain address is accessed. If the above condition is used, two successive data items for specifying a setting item to be permitted and for representing an actual setting value for the setting item should be correctly transmitted to implement the setting.

During the recording or reproducing operation, data of a current amount is frequently changed as a control of the laser output, but other data items are rarely transmitted. Therefore, a condition may be set such that a setting is permitted upon reception of data of an address associated with a laser output current and is inhibited upon reception of data of another address associated with switching between laser light sources, for example. Thus, change in the setting specified by certain data is continuously accepted, but the setting is kept unchanged when non-coincidence occurs in the address due to run-away of the CPU 10A. Further, if it is desired to maintain the current amount (for example, in the idle state), the condition determined for the setting may be changed such that all reception is inhibited in this state.

If a technique of simply permitting or inhibiting the setting is used, an extremely dangerous situation is caused due to run-away of the CPU 10A after the setting is permitted, and continues until the setting is inhibited. Therefore, two successive data items for permission and setting are transmitted to release the inhibition state. With this feature, there is almost no possibility that run-away of the CPU 10A occurs during the transmission interval between the successive two data items. In addition, even if run-away of the CPU 10A occurs, the second data item is made invalid to prevent the setting from being changed.

Further, there are techniques that enhance the safety. In one technique, the operation setting is permitted as a result of successively transmitting two items of identical setting data and confirming that results of transmission are identical to each other. In addition, the operation setting may be permitted as a result of confirming that the two items of identical setting data contain an address specifying the same operation setting item. In another technique, a data bit error due to noise is detected by checking one error detection bit which is determined based on a digital sum of the data bits, added to setting data, and obtained as a transmission result of the setting data. However, since the circuit scale becomes larger and the cost becomes higher as the number of circuit functions is increased, suitable techniques should be selected for the state of the device.

When the power source of the optical disk device is turned on, the operation setting is initially performed for the laser driver 24D and light amount detecting module 24E. At this time, the condition determining module 24B permits the operation setting simply by confirming that the operation setting condition using the number of clocks is adequate. The entire setting is made while the laser diodes LD1, LD2, and LD3 are set in the OFF state. On the control processor 10 side, it is checked whether the setting is correctly made. Finally, one of the laser diodes LD1, LD2, and LD3 is driven to emit light. Since it is not likely that run-away of the CPU 10A occurs during the limited initializing time in which an influence due to noise is generated, such run-away is negligible.

To refuse an operation for changing the setting after the initialization, the condition determining module 24B may detect only one data item and not detect any data item transmitted thereafter. By doing so, the setting can be kept unchanged during the light emission. For the case where the light amount control speed is low, there is a technique that inhibits the setting for all the addresses and transmits data for a limited number of addresses in a time-sharing manner when the control should be performed immediately. With the condition determining module 24B selectively configured as described above, it is possible to operate the laser light source in a safer state.

All of the protection techniques described above may not be used. For example, the technique used may differ to be adopted for a state of the device such as the recording or reproducing operation and a condition such as the type of the disk. No protection technique may be used in a certain case, all of the protection techniques may be used in another case or some of the protection techniques may be used in still another case. Thus, a suitable combination of the techniques may be selected for the state of the device.

For example, the condition determining module 24B permits the setting only for data items which are received with clocks whose number is counted to be "16" and which are associated with any of predetermined addresses, and discards the other data items unused for the setting.

The setting of all the setting items is permitted at the power-on time. For example, the laser type used is specified by an address as the setting item to be changed, and the setting of the laser type is made to drive the laser light source. Thereafter, predetermined addresses are set to inhibit the setting of the setting items that are specified by the addresses. Thereafter, the various operations of the drive are started.

The setting switching module 24C may change the setting of setting items such as the laser type used for operation, the current amount (for example, three types) of a light emission pulse waveform, the ON/OFF state of each laser light source, the type of the light emission pulse waveform (mono-pulse or multi-pulse), and the ON/OFF state, frequency and signal amplitude of a high-frequency superimpose signal. In this case, after the setting of the laser type, the pulse waveform, and the ON/OFF state, superimpose frequency and signal amplitude of the high-frequency superimpose signal, the setting does not need to be changed. Therefore, the setting of only the laser driving current is made changeable at any time under a control from the CPU 10A, and the other setting is inhibited.

The above embodiment is optimized as follows:

Optimum setting values for the initial setting are obtained and stored in the device during the manufacturing process. When the power source of the device is turned on, the setting is made based on the setting values. (Since different setting values are provided for types of laser light sources, a suitable one of the setting values is determined based on the laser light source to be used).

2. The recording operation is actually performed for learning of the recording condition for an optical disk at the time of disk insertion. The setting values obtained in the above-mentioned manufacturing process are selectively used as the operation condition. When a record signal is reproduced in the optimum condition and the error rate of a reproduction result exceeds a predetermined reference value, the signal amplitude and superimpose frequency are varied to derive an optimum point for updating the setting.

3. The recording operation is performed by use of the setting values derived in the items 1 and 2 described above, but the setting is made again if the following state is attained.

When the temperature sensor or the laser driving voltage is monitored to detect a variation exceeding a predetermined reference range, the setting values are changed according to a relational equation derived and stored during the manufacturing process. If possible, both of the temperature sensor and the laser driving voltage are monitored to change the setting values based on a relation thereof.

(2) Since the recording speed is slightly higher than the supply speed of user data, the recording operation is temporarily interrupted for each predetermined data amount. At this time, data recorded immediately before interruption is temporarily read and if the error rate becomes larger than the reference value, the setting is changed in a direction to enlarge a correction signal by a predetermined numeric value and next data is continuously recorded. If the result is worse in the next data, the setting is made to further reduce the correction signal in comparison with a case of the preceding condition and then recording of data is continued. If the error rate continuously becomes worse after the setting is changed by more than a preset number of times, the learning process of the item 2 is performed again and then recording of data is continued.

In the optical disk device of the present embodiment, it is determined whether the operation setting permission condition containing the number of clocks during the setting data transmission period is adequate. When the operation setting permission condition is not adequate, the operation setting corresponding to the setting data is inhibited. Therefore, the erroneous operation setting is not caused by an influence of electromagnetic noise and static electricity applied from the exterior and, as a result, a malfunction of the optical disk device can be prevented. Further, since the control processor 10 does not need to determine an error of the setting data transmitted to the automatic power control circuit 24, the operation setting can be made quickly. The automatic power control circuit 24 can determine that the operation setting permission condition containing the number of clocks during the transmission period of setting data is not adequate, even when the control processor 10 runs away in its software-based operation. Thus, the laser output of the laser light source is prevented from being erroneously set.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical disk device comprising:
a laser configured to emit laser light to be applied to an optical disk;
an output controller configured to control a laser output of the laser; and
a configuration data transmitter configured to transmit configuration data to the output controller, the output controller comprising an operation configuration module configured to set an operation configuration according to the configuration data from the configuration data transmitter and a condition determining module configured to determine whether an operation configuration permission condition comprising a number of clock cycles during a transmission period of the configuration data satisfies a predetermined condition, and to inhibit the operation configuration of the operation configuration module when the operation permission condition does not satisfy the predetermined condition.

2. The optical disk device of claim 1,
wherein the configuration data transmitter is configured to transmit a data signal representing the configuration data in a serial format, a clock signal synchronized with the data signal and an enabling signal defining the transmission period in the transmission process, and the condition determining module is configured to extract the configuration data from the data signal in synchronization with the clock signal in the transmission period defined by the enabling signal and to output the configuration data to the operation configuration module when the number of clock cycles of the clock signal obtained in the transmission period is equal to a preset value.

3. The optical disk device of claim 2, wherein the operation configuration module comprises:
a configuration switching module configured to pre-store values of a configuration of operation items and to select one of the values of the configuration of the operation items according to the configuration data from the condition determining module; and a configuration module configured to set the value of the operation item selected by the configuration switching module.

4. The optical disk device of claim 2, wherein the condition determining module is configured to confirm that at least two configuration data items sequentially received from the configuration data transmitter are identical to each other and then to output one of the configuration data items to the operation configuration module.

5. The optical disk device of claim 2, wherein the condition determining module is configured to confirm that at least two configuration data items sequentially received from the configuration data transmitter comprise an address that addresses an identical operation configuration item and then to output one of the configuration data items to the operation configuration module.

6. The optical disk device of claim 1, wherein the condition determining module is configured to inhibit an operation configuration of the operation configuration module when the condition determining module detects an error of configuration data from the configuration data transmitter based on error check data added to the configuration data.

7. The optical disk device of claim 1, wherein the output controller is configured to store the configuration data used in the operation configuration by the operation configuration module and the configuration data transmitter is configured to re-send configuration data when the configuration data transmitter reads out the configuration data stored in the output controller and detects an error in the read configuration data.

8. The optical disk device of claim 1, wherein the operation configuration module is configured to initialize a configuration in such a manner that a laser driving current is set substantially minimum when the laser starts to be driven according to the configuration data transmitted immediately after a power is turned on.

9. A control method for an optical disk device which comprises a laser configured to emit laser light to be applied to an optical disk, an output controller configured to control a laser output of the laser, and a configuration data transmitter configured to transmit a configuration data to the output controller, the method comprising:
- determining whether an operation permission condition comprising a number of clock cycles during a transmission period of the configuration data satisfies a predetermined condition; and inhibiting the operation configuration corresponding to the configuration data when the operation configuration permission condition does not satisfy the predetermined condition.

* * * * *